United States Patent

[11] 3,566,142

[72] Inventor Arthur Cedric Dabell
 49 Beech Ave., Sandiacre, Derbyshire, England
[21] Appl. No. 848,967
[22] Filed Aug. 11, 1969
[45] Patented Feb. 23, 1971

[54] COOLING SYSTEMS FOR ELECTRICITY GENERATING EQUIPMENT
 3 Claims, 5 Drawing Figs.
[52] U.S. Cl. .................................................. 290/1, 310/58
[51] Int. Cl. .................................................. H02k 9/14
[50] Field of Search ...................................... 290/1, 2, 40, 1 (A), 1 (B); 322/100; 310/58

[56] References Cited
UNITED STATES PATENTS
2,177,687  10/1939  Bracken et al. ............... 290/1(A)
2,630,537  3/1953  Wiegman et al. ............. 290/1(A)
2,735,030  2/1956  Brainard ....................... 290/1
3,418,485  12/1968  Anderson et al. ............. 290/52X Primary Examiner—G. R. Simmons
Attorney—Julian J. Schamus ABSTRACT: A cooling system for electricity generating equipment comprises an enclosure having two compartments, a generator and electrical components being arranged in one compartment and an engine which drives the generator in the other compartment, a duct being provided leading from the upper part of the enclosure through which warm air from within the enclosure will pass to an outlet, and an exhaust pipe from the engine being introduced into this duct and extending along it, the exhaust pipe terminating within the duct and the internal bore of the duct having a venturi restriction in the region of the end of the exhaust pipe.

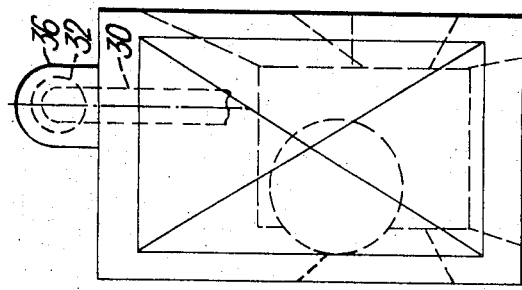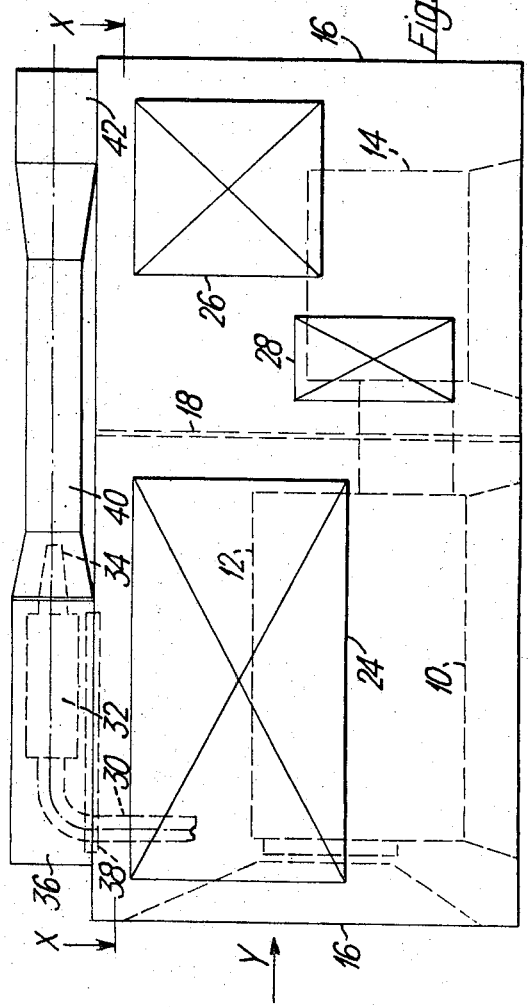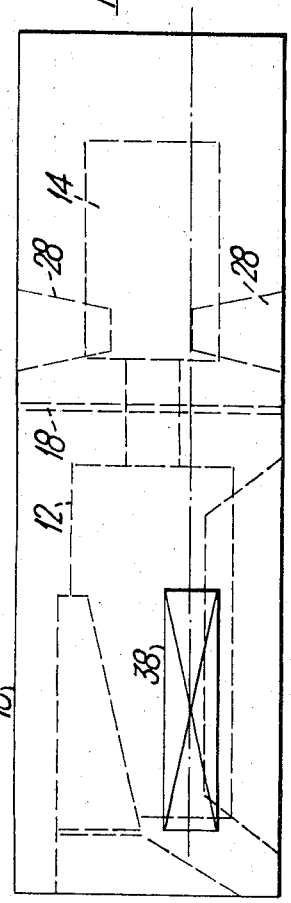

Inventor
A.C. DABELL

COOLING SYSTEMS FOR ELECTRICITY GENERATING EQUIPMENT

This invention relates to cooling systems for electricity generating equipment.

The invention is concerned more particularly with transportable or vehicle-mounted equipment.

Such equipment normally includes an engine, usually a diesel engine, and a generator, usually an alternator and the equipment is accommodated in some form of enclosure or housing; the dimensions of the housing are subject to physical limitations. Quite apart from the cooling of the working parts of the engine itself, which may be air-cooled or water-cooled, the whole body of metal constitutes a heat sink and consequently gives rise to an undesirably warm atmosphere in the enclosure or housing. There is thus a temperature-difference between the ambient temperature and the internal temperature, and while this can be reduced to some extent by providing grilles and so forth it still persists to an undesirable extent.

According to the present invention the enclosure or housing is provided with an outlet duct leading from the upper part thereof through which warm air from within the enclosure or housing will pass, and an exhaust pipe from the engine is introduced into this duct and extends along it, the exhaust pipe terminating within the duct and the internal bore of the duct having a venturi restriction in the region of the end of the exhaust pipe.

The effect of this arrangement is that the exhaust gases issuing under pressure from the end of the exhaust pipe promote a strong flow of air along the duct and thus a pronounced scavenging effect on the interior of the enclosure or housing is exerted which has the effect of reducing the air temperature within the enclosure or housing.

In a preferred arrangement the engine is mounted in one compartment of the enclosure or housing and the generator and other electrical apparatus in another compartment which is thermally insulated from the engine compartment; the generator compartment may be provided with its own cooling system if desired.

The invention is of particular value for equipment intended to operate in extreme environmental conditions where complete enclosure of the equipment is essential, where high air temperatures make it difficult to maintain a sufficiently cool atmosphere in the enclosure or housing, and in circumstances where heretofore it has been necessary to operate an engine at a lower power output than would otherwise be the case in order to avoid raising the temperature in the housing or enclosure unduly.

A constructional form of the invention will now be described with reference to the accompanying drawings which illustrate an air-cooled Diesel Alternator Generating Plant.

FIG. 1 is a near side elevation;

FIG. 4 is an end view looking in the direction of the arrow Y, FIG. 1; and

FIG. 5 is a plan.

Figure 2:
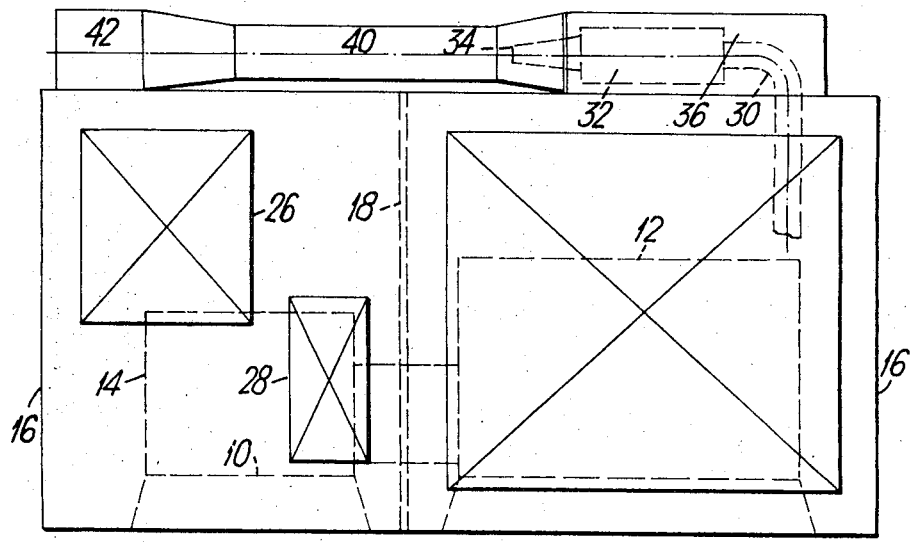
FIG. 2 is an off side elevation.
Figure 3:
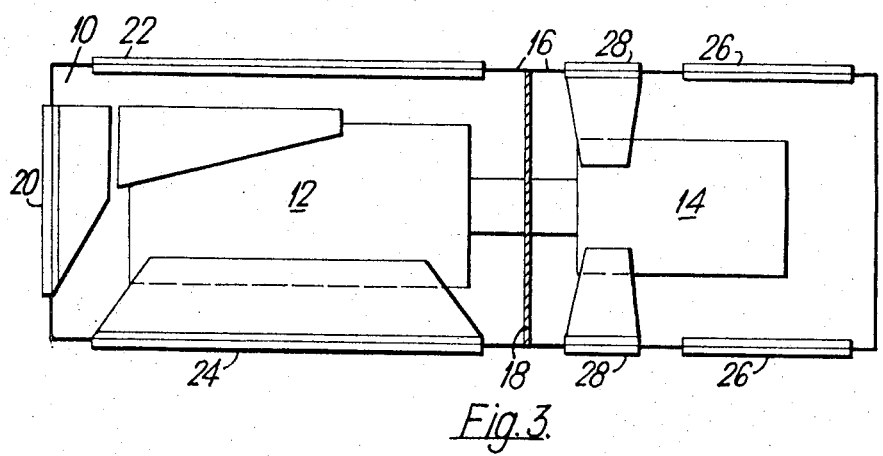
FIG. 3 is a section on line X–X of FIG. 1.

The apparatus comprises a mounting frame 10, an engine 12, an alternator 14, and a dusttight housing or enclosure 16. There is a division 18 within the housing or enclosure which forms two separate compartments, the engine being contained in one and the alternator in the other. Panels 20, 22 incorporating air filters, serve to admit ambient air to the engine compartment, the cooling air for the engine being directly ducted to the engine intake fan, while the air is exhausted from the engine outlet duct to an outlet panel 24. The alternator compartment similarly has air intake and outlet panels 26, 28 respectively. The exhaust pipe 30 from the engine delivers into a silencer 32 leading into a tapered nozzle 34. This is enclosed within an outlet duct 36 which receives air from the engine compartment by way of a cutout 38 in the roof of the housing 16, and the nozzle 34 discharges into the throat of a venturi passage 40 in the outlet duct 36. The outlet expansion section of the duct 36 beyond the venturi passage 40 is shown at 42. It will be seen that the exhaust gases from the engine, discharged from the nozzle 34 into the venturi passage, exert a strong scavenging action by drawing air from the engine compartment thus creating a strong flow of ambient air through the filter intake into the compartment. The exhaust and output ductwork is lagged to reduce radiated heat from these components.

The effect of these arrangements is that the engine lubricating oil temperature can be maintained at an acceptable level when the external ambient air temperature is as high as may be encountered in tropical or desert regions, while excessive heating or the silencer is prevented and heat transfer to the alternator compartment is reduced.

The position of the nozzle outlet 34 relative to the venturi throat, and of the outlet section 42 may both have provision for adjustment.

I claim:

1. The combination with an electricity generating equipment having a generator and an engine driving the said generator, of an enclosure for said generator and engine, an outlet duct leading from the said enclosure whereby warm air from within the enclosure will pass through the outlet duct, exhaust means leading from the engine into the outlet duct and terminating within the outlet duct, the duct having an internal bore and a venturi restriction in said bore, the venturi restriction being situated in the region of the termination of the exhaust means, whereby in use exhaust gases issuing under pressure from the exhaust pipe will promote a strong flow of air along the duct and thus a scavenging effect on the interior of the enclosure.

2. Apparatus as claimed in claim 1 having an internal division in the enclosure, the division forming two compartments, the engine being contained in one compartment and the generator in the other, and each compartment having air intake and outlet means.

3. An electricity generating equipment and cooling system as claimed in claim 1 comprising a mounting frame, a dusttight enclosure over said frame, a vertical division in the enclosure forming two separate compartments, an alternator in one compartment, an engine for driving the alternator in the other compartment, air intake and outlet panels on each compartment, a roof on the enclosure, said outlet duct leading from the engine compartment through said roof, an exhaust pipe leading from the engine into the outlet duct, a nozzle end on said exhaust pipe and said end being situated in the region of said venturi restriction.